(12) United States Patent
Morris et al.

(10) Patent No.: US 8,099,058 B1
(45) Date of Patent: Jan. 17, 2012

(54) ENHANCED WIDEBAND TRANSCEIVER

(75) Inventors: Bradley John Morris, Ottawa (CA); Edward M. Sich, Kanata (CA)

(73) Assignee: Rockstar Bidco, LP NY (US)

( * ) Notice: Subject to any disclaimer, the term of this patent is extended or adjusted under 35 U.S.C. 154(b) by 0 days.

(21) Appl. No.: 13/052,752

(22) Filed: Mar. 21, 2011

Related U.S. Application Data

(63) Continuation of application No. 11/963,385, filed on Dec. 21, 2007, now Pat. No. 7,929,917.

(51) Int. Cl.
*H04B 1/00* (2006.01)
*H04B 7/00* (2006.01)

(52) U.S. Cl. ........ 455/69; 455/84; 455/76; 455/88; 455/562.1; 455/118; 455/114.3; 455/126; 375/141; 375/145

(58) Field of Classification Search .......... 455/69, 455/76, 78, 88, 84, 562.1, 118, 114.3, 126, 455/127.4; 375/141, 145
See application file for complete search history.

(56) References Cited

U.S. PATENT DOCUMENTS

| | | | |
|---|---|---|---|
| 5,537,435 A * | 7/1996 | Carney et al. | 375/219 |
| 5,592,480 A * | 1/1997 | Carney et al. | 370/347 |
| 5,832,022 A * | 11/1998 | Scott | 375/142 |
| 5,848,097 A * | 12/1998 | Carney et al. | 375/219 |
| 6,167,099 A * | 12/2000 | Rader et al. | 375/347 |
| 6,480,553 B1 * | 11/2002 | Ho et al. | 375/272 |
| 7,050,777 B2 | 5/2006 | Cai | |
| 7,072,626 B2 | 7/2006 | Hadjichristos | |
| 7,342,455 B2 | 3/2008 | Behzad et al. | |
| 7,366,478 B2 | 4/2008 | Kerth et al. | |
| 7,395,040 B2 | 7/2008 | Behzad | |
| 7,437,139 B2 | 10/2008 | Lo et al. | |
| 7,477,879 B1 | 1/2009 | Ganti et al. | |
| 7,558,539 B2 | 7/2009 | Huynh et al. | |
| 7,567,758 B2 | 7/2009 | Aronson et al. | |
| 7,579,922 B2 | 8/2009 | Jensen et al. | |
| 7,593,695 B2 * | 9/2009 | Jensen | 455/76 |
| 7,715,836 B2 * | 5/2010 | Vassiliou et al. | 455/423 |
| 7,778,352 B2 | 8/2010 | Jensen et al. | |
| 7,792,228 B2 * | 9/2010 | Yoon | 375/350 |
| 7,844,014 B2 * | 11/2010 | Keerthi et al. | 375/296 |
| 7,929,917 B1 | 4/2011 | Morris et al. | |
| 7,933,562 B2 * | 4/2011 | Rofougaran et al. | 455/80 |

* cited by examiner

*Primary Examiner* — Marceau Milord
(74) *Attorney, Agent, or Firm* — Conley Rose, P.C.; Rodney B. Carroll; Bernard Tiegerman

(57) ABSTRACT

A method for operating an integrated transceiver, comprising coupling an operating transmitter and an operating receiver within the integrated wideband receiver, inputting a signal into the operating transmitter, performing a first conversion of the signal, wherein the signal is converted into a second signal, transmitting the second signal into the operating receiver, performing a second conversion of the signal, wherein the signal is converted into a third signal, transmitting the third signal into the operating transmitter, and adjusting the operating transmitter.

18 Claims, 15 Drawing Sheets

ENHANCED WIDEBAND TRANSCEIVER

CROSS-REFERENCE TO RELATED APPLICATIONS

This is a Continuation application of U.S. patent application Ser. No. 11/963,385, filed on Dec. 21, 2007, and entitled "Enhanced Wideband Transceiver," which is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to integrated wideband transceivers and, more particularly, to a device and method for sharing the components of an operational receiver with an operational transmitter.

BACKGROUND OF THE INVENTION

Wideband transceivers typically contain both transmitters and receivers. Transmitters are used to take a signal from a communication device, generate a high power signal (e.g., amplify the signal) that can be transmitted from the communication device to a destination, and then propagate the signal away from the transmitter to the destination. Receivers take a signal that has been transmitted from a destination and pass the signal to the communication device.

One of the problems with existing amplification systems is the requirement for a separate feedback receiver within the transmitter component. A separate feedback receiver is generally needed in the transmitter component so that the operation of the transmitter may be adjusted. The requirement of a feedback receiver increases the board area, cost, and power consumption of the transmitter.

SUMMARY OF THE INVENTION

Disclosed herein is an integrated wideband transceiver system, comprising a signal processor, an integrated wideband transceiver coupled to the signal processor, wherein the integrated wideband transceiver comprises a receiver and a transmitter, and wherein the receiver and transmitter are coupled together, and wherein the coupling of the receiver and the transmitter creates a closed loop, and wherein the closed loop allows the transmitter to pass a signal through at least part of the receiver, and a transmission unit coupled to the integrated wideband transceiver. The transmission unit may be an antenna and the signal processor is a communication device. The at least part of the receiver may comprise an RF/Baseband conversion element. The closed loop may be a feedback loop. The closed loop may be a training loop for the transmitter. The transmitter may contain a digital to analog conversion. The receiver may contain an analog to digital conversion.

Also disclosed herein is a method for operating an integrated transceiver, comprising coupling an operating transmitter and an operating receiver within the integrated wideband receiver, inputting a signal into the operating transmitter, performing a first conversion of the signal, wherein the signal is converted into a second signal, transmitting the second signal into the operating receiver, performing a second conversion of the signal, wherein the signal is converted into a third signal, transmitting the third signal into the operating transmitter, and adjusting the operating transmitter.

Further disclosed herein is a method of operating an integrated transceiver, comprising operating a transceiver, wherein the transceiver comprises both a transmitter and receiver, and wherein the uplink and downlink signal are operated in a time duplex domain, accepting a transmitter signal from a source into the transmitter, preparing the transmitter signal for transmission by the transmitter, passing at least part of the prepared transmitter signal into the receiver, sampling the prepared transmitter signal during time when the transmitter is active to form a sampled signal, passing the sampled signal through the receiver to create a received sampled signal; and passing the received sampled signal into the transmitter.

Further disclosed herein is a method of operating an integrated transceiver, comprising operating a transceiver, wherein the transceiver comprises both a transmitter and receiver, and wherein the uplink and downlink signal are operated in a frequency duplex domain, accepting a transmitter signal from a source into the transmitter, preparing the transmitter signal for transmission by the transmitter, passing at least part of the transmitter signal into the receiver, wherein the receiver monitors both the transmitting frequency domain and the receiving frequency domain, detecting the transmission of the transmitter signal from the transmitter, and creating a sampled signal from the detected transmitter signal, passing the sampled signal through the receiver to create a received sampled signal, and passing the received sample signal into the transmitter.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. It is further understood that as used herein, terms such as "coupled," "connected," "electrically connected," "in signal communication," and the like may include direct connections between components, indirect connections between components, or both, as would be apparent in the overall context of a particular embodiment. The term "coupled" is intended to include, but not be limited to, a direct or indirect electrical connection. The terms pass, passing, transmit, transmitted, or transmitting is intended to include, but not be limited to, the electrical transmission of a signal from one device to another. In some embodiments, the present disclosure also contains embodiments directed at waveforms of a complex nature (real and imaginary components) as commonly used in digital modulation schemes such as Phase-shift Keying (mPSK) and Quadrature Amplitude Modulation (mQAM), wherein the 'm' in both mPSK and mQAM is any integer. In some other embodiments, the present disclosure also contains embodiments directed to systems employing scalar signals.

Figure 1:
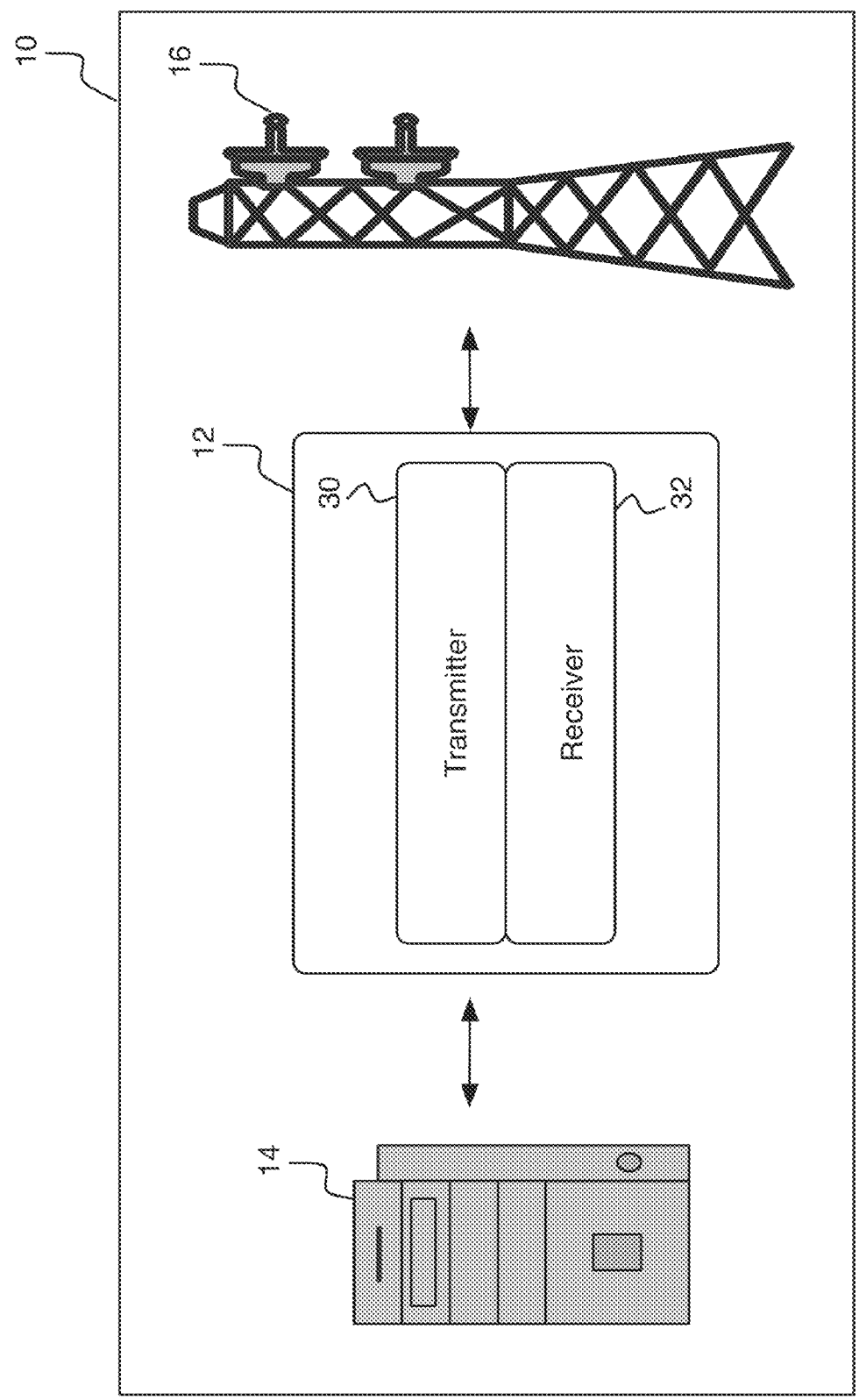
FIG. 1 is a block diagram of one embodiment of a system comprising an enhanced wideband transceiver.

As shown in FIG. 1, the present disclosure contemplates an integrated wideband transceiver system 10 comprising an integrated wideband transceiver 12 coupled to both a communication device 14 and an antenna 16. The integrated wideband transceiver 12 comprises an operational transmitter 30 and an operational receiver 32. In this embodiment, integrated wideband transceiver 12 is capable of sending and receiving signals from both communication device 14 and antenna 16. One of the innovative features of integrated wideband transceiver 12 is that rather than operational transmitter 30 and operational receiver 32 being two unconnected elements, operational transmitter 30 and operational receiver 32 are coupled together so as to enable a signal to be passed from operational transmitter 30 through operational receiver 32 and back into operational transmitter 30. This configuration permits the use operational receiver 32, already present within integrated wideband transceiver 12, as part of a feedback loop for operational transmitter 30. Therefore, no separate receiver feedback loop is required for operational transmitter 30. This reduces the cost and complexity of integrated wideband transceiver 12.

Communication device 14 is any device capable of sending or receiving any kind of signal, including analog and digital signals. It is expressly contemplated that communication device 14 may contain components substantially similar to those found in a mobile terminal or handset, a mobile telephone base station, a computer, or any other device capable of creating, altering, sending, or receiving signals. It is further contemplated that one or more communication devices may be present consistent with communication device 14. For instance, communication device 14 may actually compose two or more separate devices, such as a signal generator and a signal receiver. The instance of a single element illustrating communication device 14 is given for exemplary purposes only and should not be construed as limiting.

Antenna 16 is depicted as an antenna array mounted to a tower, it is expressly understood that antenna 16 could be selected from a group comprising one or more duplexers, filters, antennas, or any combination thereof. The term "antenna" is intended to refer to any device that can transmit, receive, filter, propagate, or otherwise transfer a signal from one destination to another. As with communication device 14 it is expressly contemplated that one or more antennas may be used consistent with the present disclosure, and the single element of antenna 16 is shown for exemplary purposes only and should not be construed as limiting.

Integrated wideband transceiver 12 comprises operational transmitter 30 coupled to the operational receiver 32. The use of the term "operational" is, in some embodiments, intended to denote the function of operational transmitter 30 and operational receiver 32. While both operational transmitter 30 and operational receiver 32 send and receive signals, the function of operational transmitter 30 within integrated wideband transceiver 12 is to prepare and convey a signal from communication device 14 and the function of operational receiver 32 is to receive and prepare a signal for communication device 14.

For instance, in some embodiments, operational transmitter 30 will receive an unprepared outgoing signal from communication device 14, prepare the signal to be transmitted, and then transmit the prepared outgoing signal to antenna 16. Consistent with this embodiment, the operational receiver 32 will receive an unprepared incoming signal from antenna 16, prepare the signal to be transmitted to communication device 14, and then transmit the signal to communication device 14. The use of the term "prepare" is intended to refer to any manipulation of a signal by any element within operational transmitter 30 and the operational receiver 32, including, but not limited to, the application of a filter, a mixer, a digital to analog conversion, an analog to digital conversion, an amplification, or other manipulation or change to the signal.

The coupling of operational transmitter 30 and operational receiver 32 permits a signal to be passed from operational transmitter 30 into operational receiver 32 and back into operational transmitter 30. For example, operational transmitter 30 transmits an operational transmitter feedback signal into operational receiver 32, and operational receiver 32 transmits an operational receiver feedback signal into operational transmitter 30. It is explicitly understood that the passing of the operational transmitter feedback signal and the operational receiver feedback signal creates a closed loop. It is further explicitly understood that the closed loop created by the operational transmitter feedback signal and the operational receiver feedback signal may be used by operational transmitter 30, for any purpose, including, but not limited to, training, adaptive training, linearization, or any other purpose known to one skilled in the art.

Figure 2:
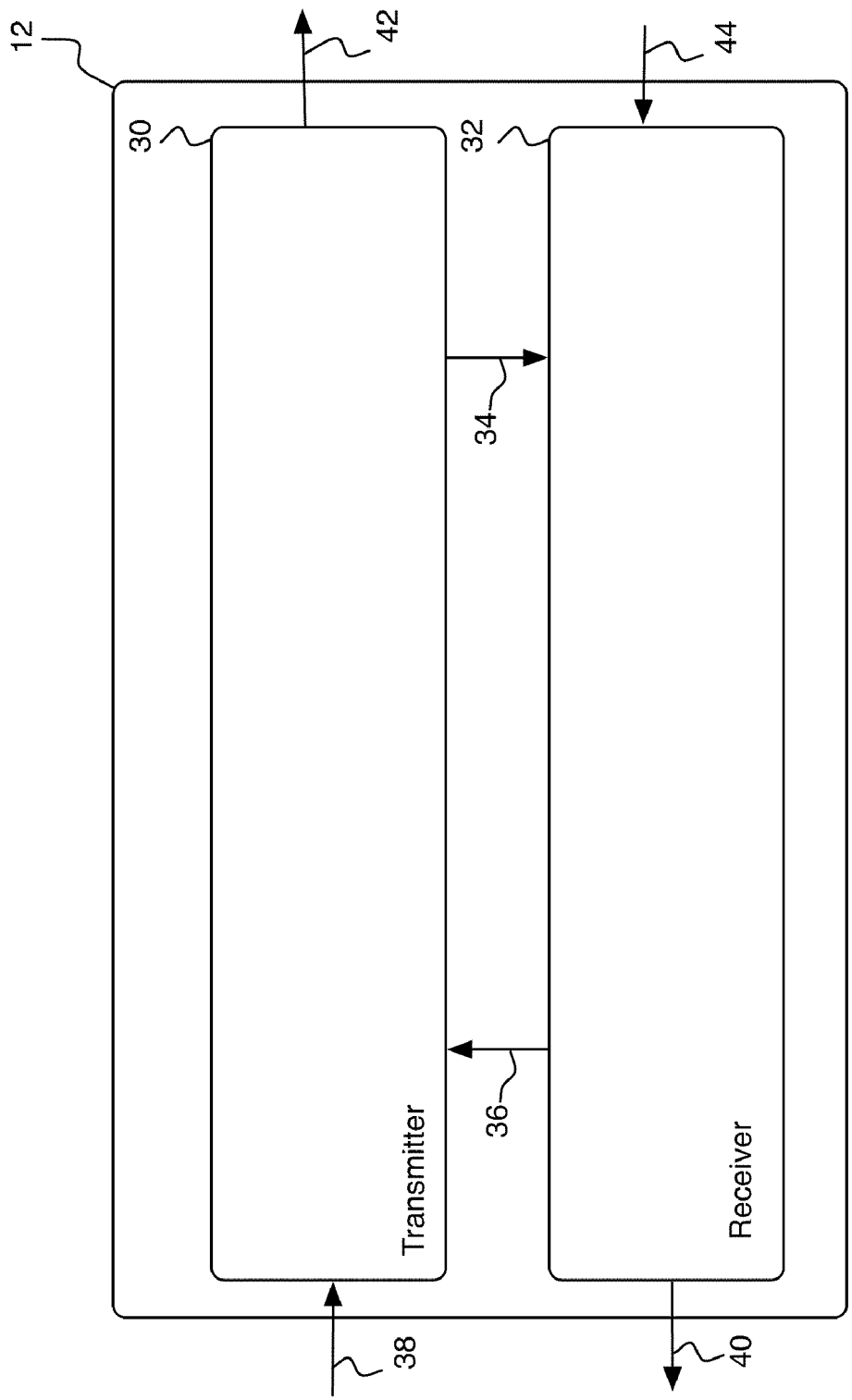
FIG. 2 is a block diagram of an enhanced wideband transceiver.

While integrated wideband transceiver 12, communication device 14 and antenna 16 are illustrated as separate devices, it is expressly understood that they may be integrated into a single device. For instance, a mobile phone may have integrated wideband transceiver 12, communication device 14 and antenna 16 all integrated into a single housing. The scope of this disclosure should not be limited by the illustrative representation of integrated wideband transceiver 12, communication device 14, and antenna 16 as separate devices FIG. 2 is a block diagram of an integrated wideband transceiver 12 illustrating the coupling of operational transmitter 30 and operational receiver 32. In this figure, integrated wideband transceiver 12, operational transmitter 30, and operational receiver 32 are coupled together with first transmitter output 34 and first receiver output 36. Operational transmitter 30 also has a transmitter input 38 and a second transmitter output 42. Operational receiver 32 has a receiver input 44 and a second receiver output 40. It is contemplated that transmitter input 38 and second receiver output 40 may connect to the same communication device 14 or two or more communication devices. It is further contemplated that second transmitter output 42 and receiver input 44 may connect to antenna 16, two or more antennas, one or more duplexers, or one or more filters.

In the block diagram of FIG. 2, the signal paths used to transmit the operational transmitter feedback signal and the operational receiver feedback signal are illustrated. In this embodiment, first transmitter output 34 is used to transmit the operational transmitter feedback signal into operational receiver 32. Also in this embodiment, first receiver output 36 is used to transmit operational receiver feedback signal from operational receiver 32 into operational transmitter 30.

One of the innovative elements disclosed by FIG. 2 is the creation of a closed loop using first transmitter output 34 and first receiver output 36. The first half of the closed loop is created by feeding the output from operational transmitter 30 through first transmitter output 34 into operational receiver 32. The second half of the closed loop is created by feeding the output from operational receiver 32 through first receiver output 36 into transmitter. Examples of specific locations of input and output are shown in FIGS. 3-7. This closed loop is used by operational transmitter 30 as a feedback loop.

One of the problems with existing amplification systems is the requirement of separate feedback receivers within the transmitter. A feedback receiver is generally needed in a transmitter so that the transmitter may be adjusted so as to operate properly. Adjustments include, but are not limited to, the training of the amplifier. These feedback receivers are generally integrated into the transmitter and are operated separately from other elements, such as the receiver, within the transceiver. The requirement of a separate feedback receiver increases the board area, cost, and power consumption of the transmitter. In addition, the feedback receiver increases the number of parts required for operation which introduces another level of difficulty involved in meeting linearity requirements within the guidelines of existing standards. One of the advantages of the present disclosure is that the closed loop created may be used instead of a feedback receiver.

Figure 3:
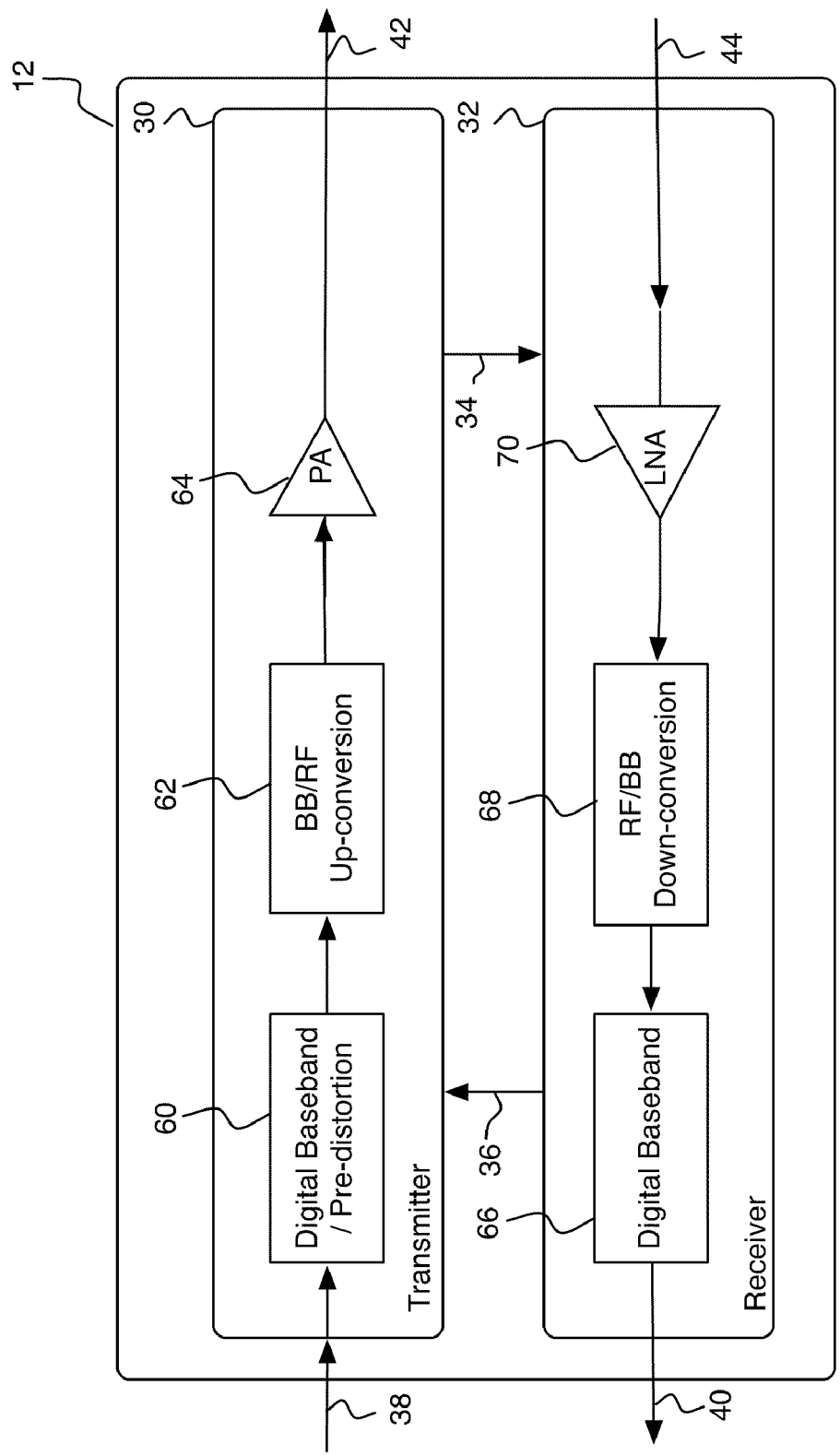
FIG. 3 is a block diagram of an enhanced wideband transceiver illustrating the transmitter and the receiver.

FIG. 3 is a block diagram illustrating elements within the operational transmitter 30 and the operational receiver 32. This figure is intended as an orientation for the components contained within operational transmitter 30 and operational receiver 32. It should be expressly understood that in this figure, as in other figures, each of the elements is coupled together and may be repositioned in any way known to one skilled in the art. The specific order illustrated in any figure therefore should not be construed as limiting the scope of this disclosure.

Figure 8:
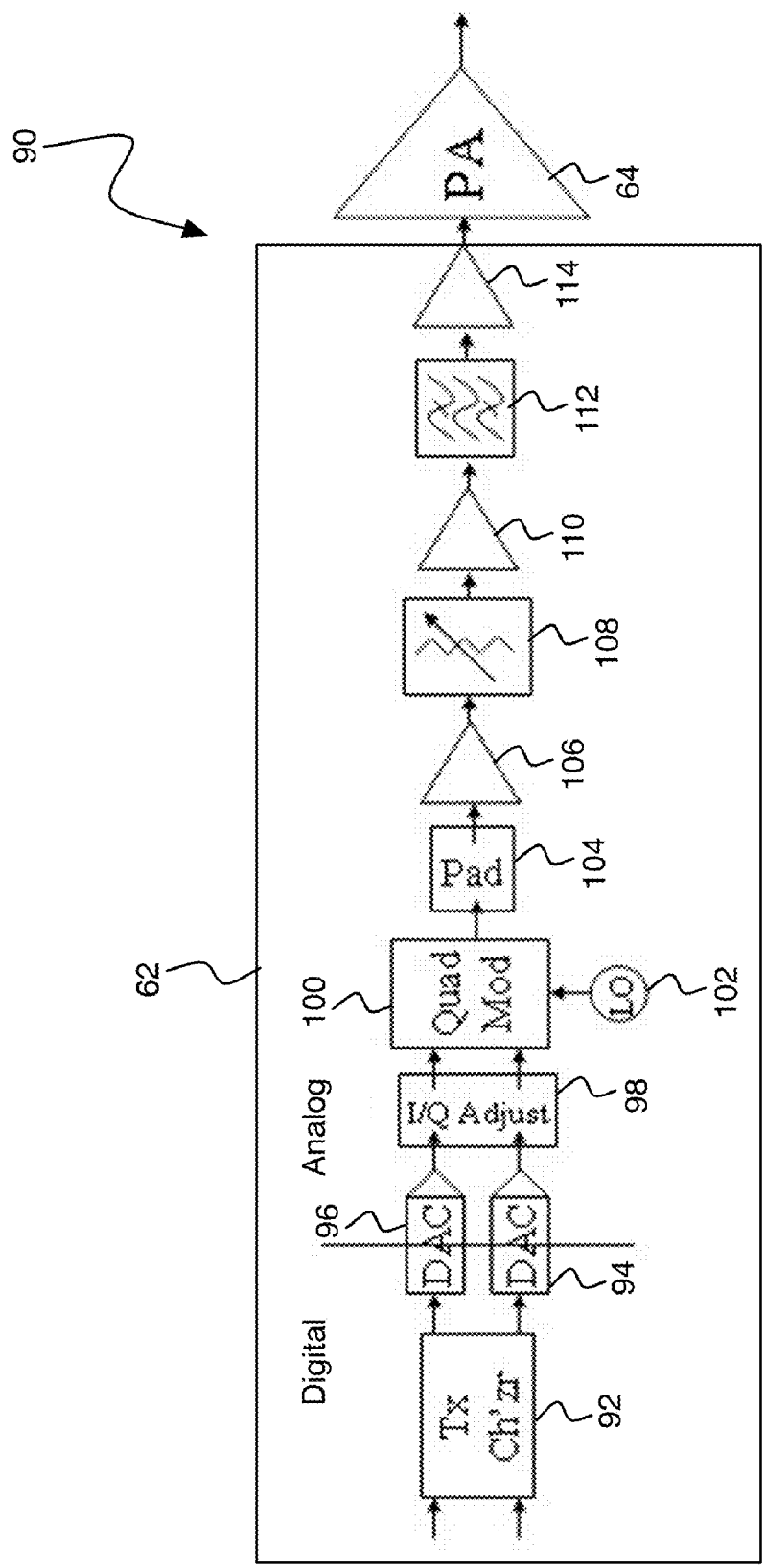
FIG. 8 is a block diagram of one example of a baseband to radio frequency up conversion element.
Figure 9:
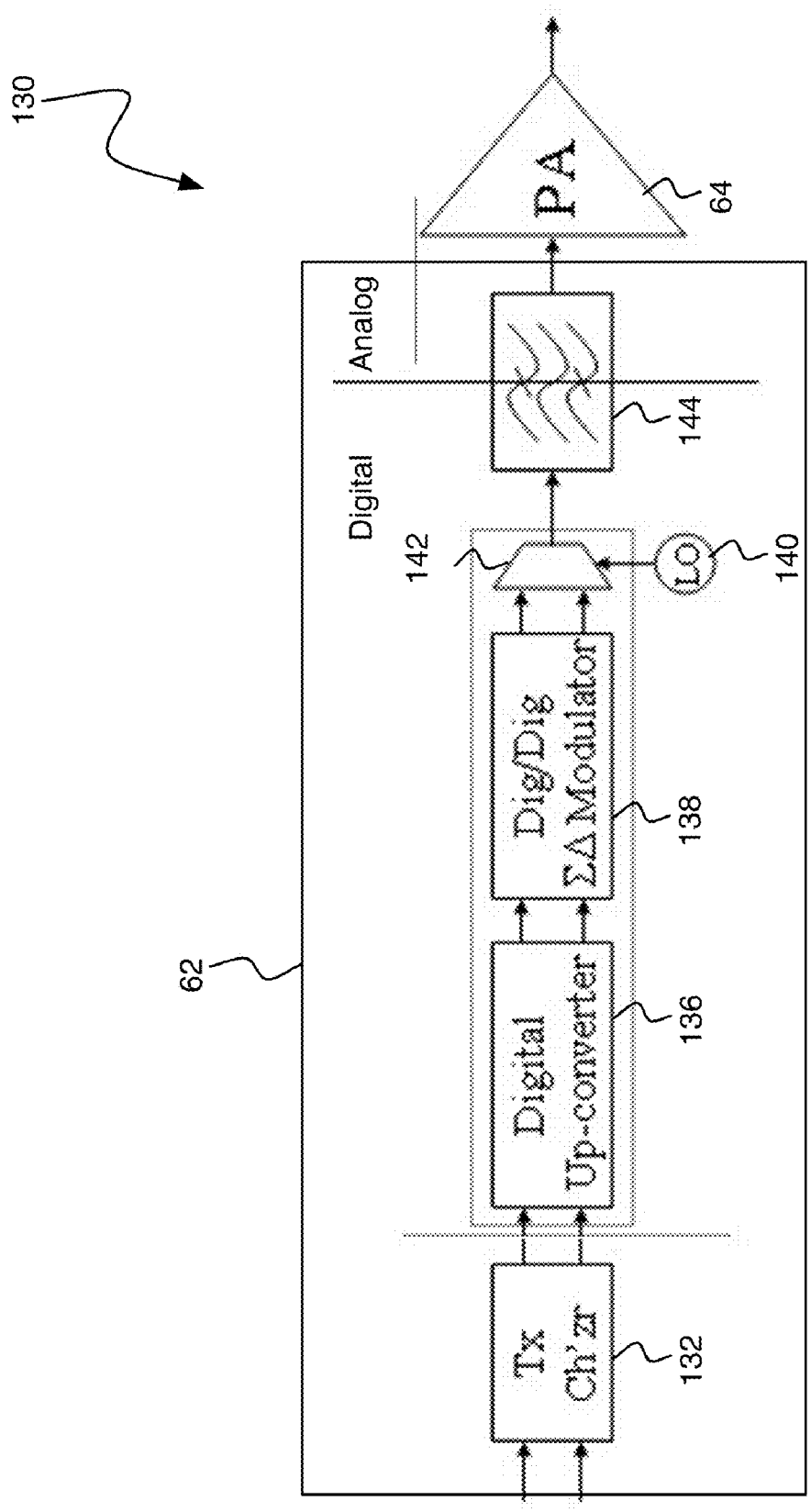
FIG. 9 is a block diagram of a second example of a baseband to radio frequency up conversion element.

The operational transmitter 30 of FIG. 3 comprises a digital baseband digital baseband pre-distortion 60, a baseband to radio frequency up conversion device 62, and a power amplifier 64. The digital baseband pre-distortion 60 takes a signal from transmitter input 38 and prepares the signal for baseband up conversion. This preparation may take the form of introducing distortion that will adjust for any effect, such as non-linearity, of baseband to radio frequency up conversion device 62 and power amplifier 64. Baseband to radio frequency up conversion device 62 is used to prepare the signal for amplification, and may include a digital to analog conversion. Examples of baseband to radio frequency up conversion device 62 are shown in FIG. 8 and FIG. 9. Power amplifier 64 is used to amplify the signal from baseband to radio frequency up conversion device 62 and prepare the signal for transmission by antenna 16.

Figure 10:
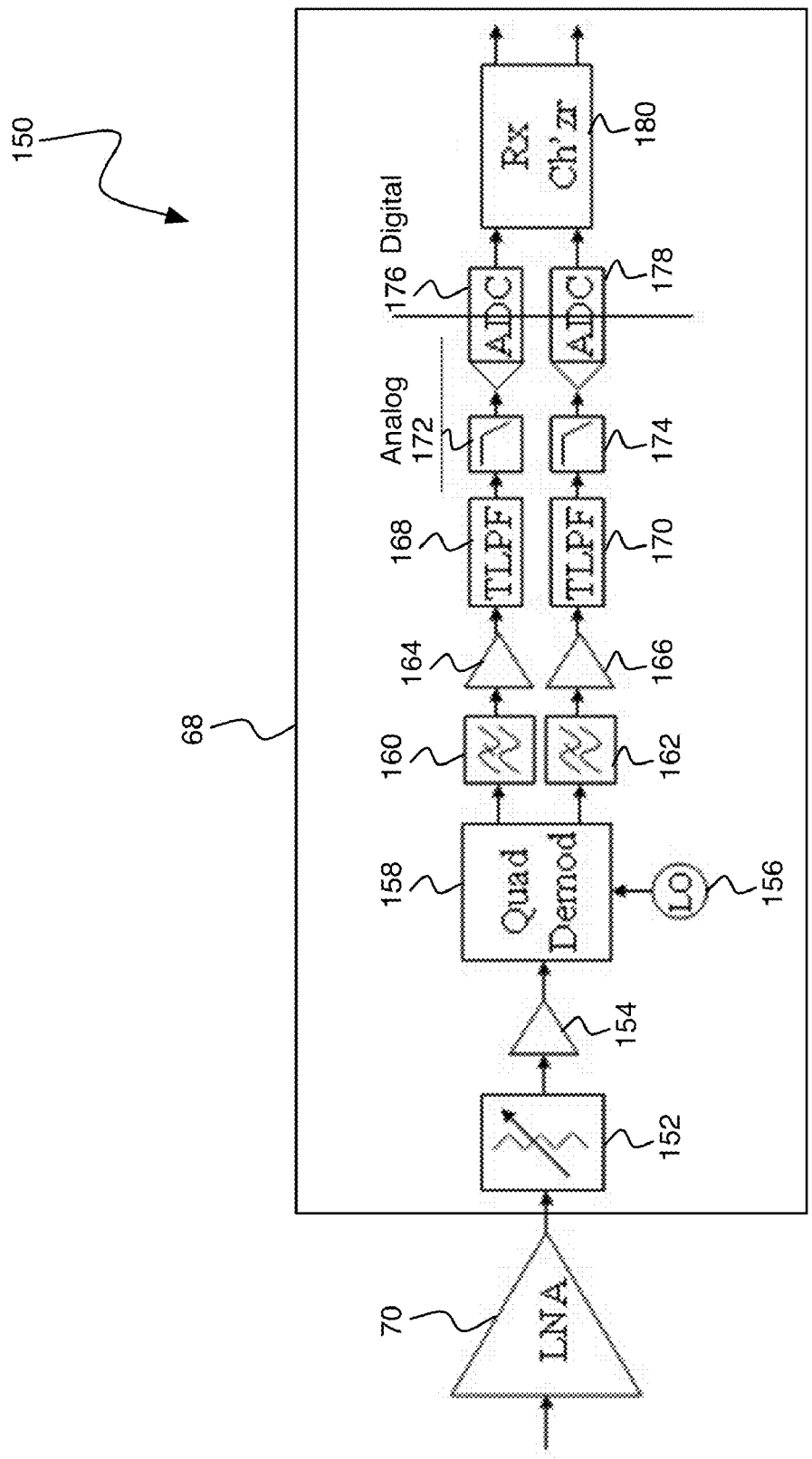
FIG. 10 is a block diagram of one example of a radio frequency to baseband down conversion element.
Figure 11:
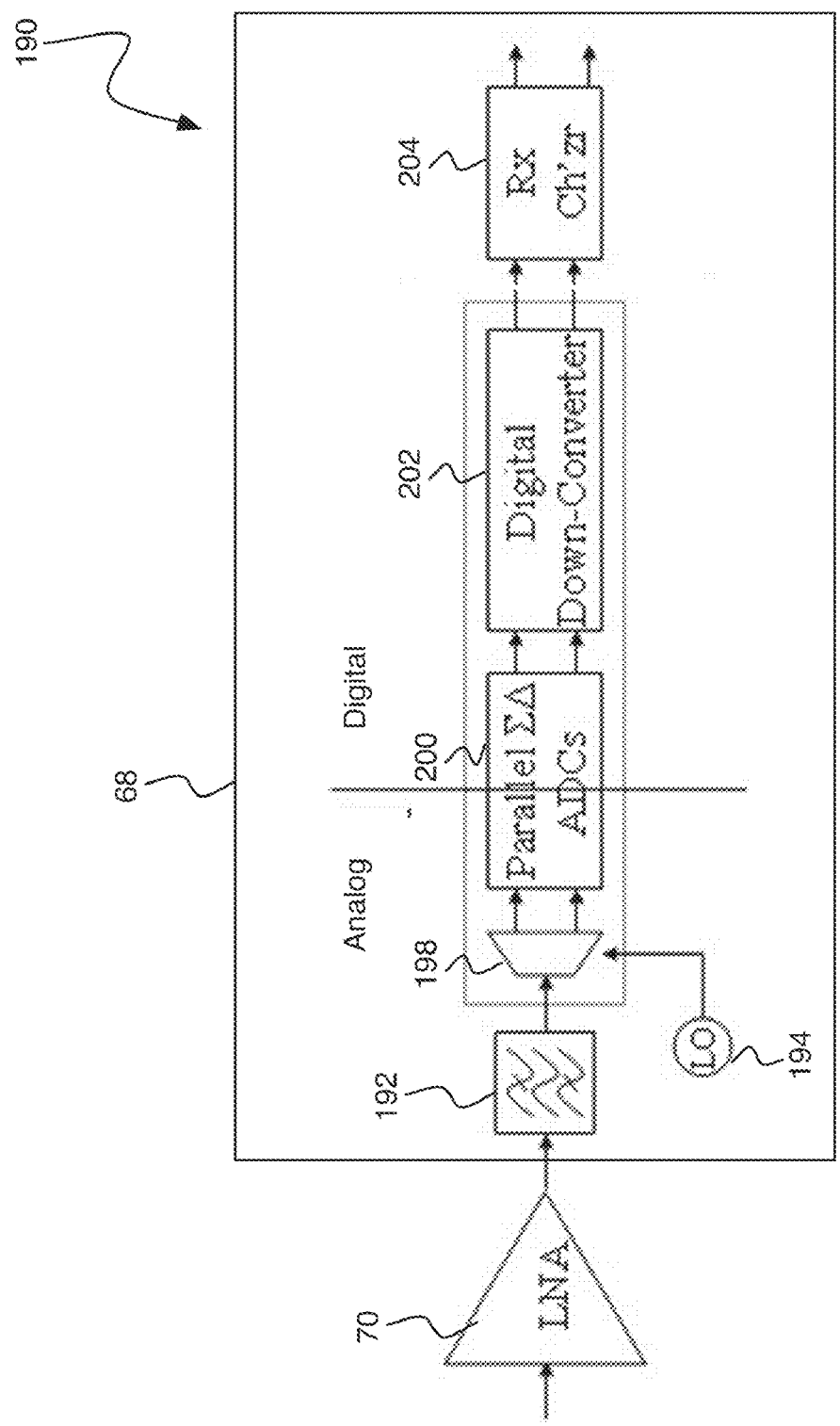
FIG. 11 is a block diagram of a second example of a radio frequency to baseband down conversion element.

The operational receiver 32 comprises a low noise amplifier (LNA) 70 coupled to radio frequency to baseband down conversion device 68 and a digital baseband 66. LNA 70 accepts a signal from receiver input 44 and amplifies the signal for radio frequency to baseband down conversion device 68. Radio frequency to baseband down conversion device 68 is used to prepare the signal for demodulation or digital processing and may include an analog to digital conversion. Examples of radio frequency to baseband down conversion device 68 are shown in FIG. 10 and FIG. 11. Digital baseband 66 is used to digitally process the signal from radio frequency to baseband down conversion device 68 and prepare the signal for reception by communication device 14.

Figure 4:
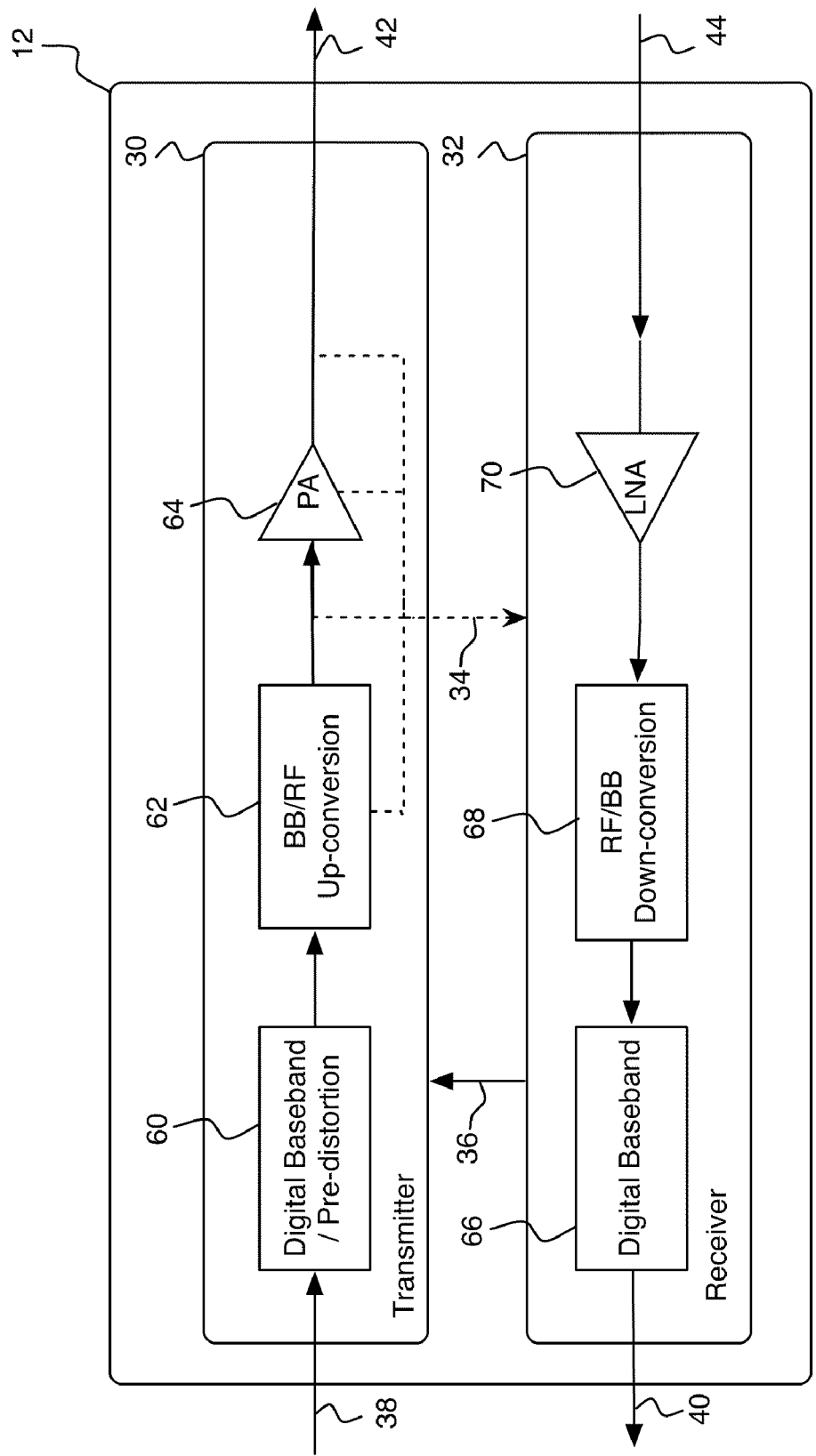
FIG. 4 is a block diagram of an enhanced wideband transceiver illustrating one embodiment of the connections between the transmitter and the receiver.
Figure 5:
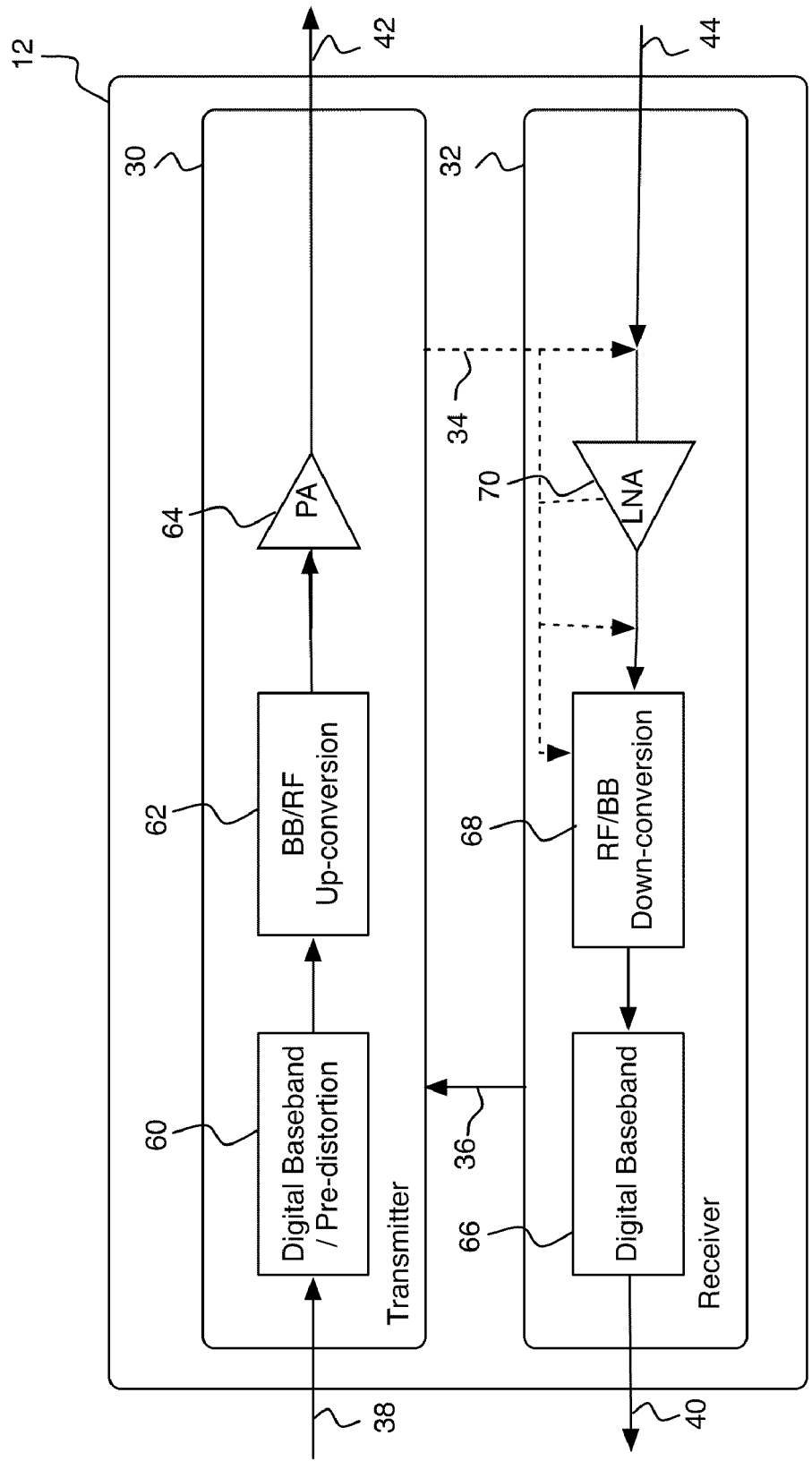
FIG. 5 is a block diagram of an enhanced wideband transceiver illustrating another embodiment of the connections between the transmitter and the receiver.
Figure 6:
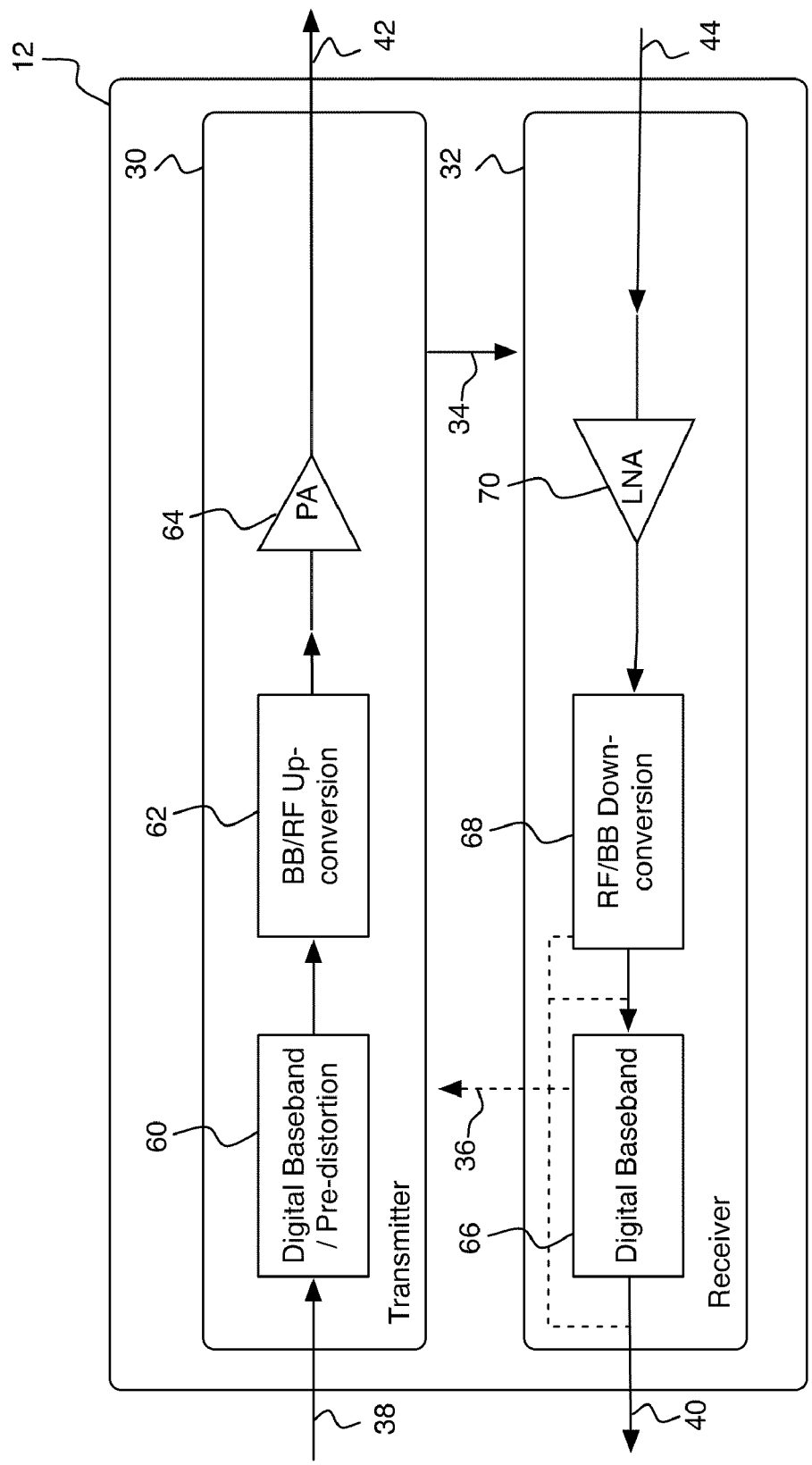
FIG. 6 is a block diagram of an enhanced wideband transceiver illustrating yet another embodiment of the connections between the transmitter and the receiver.
Figure 7:
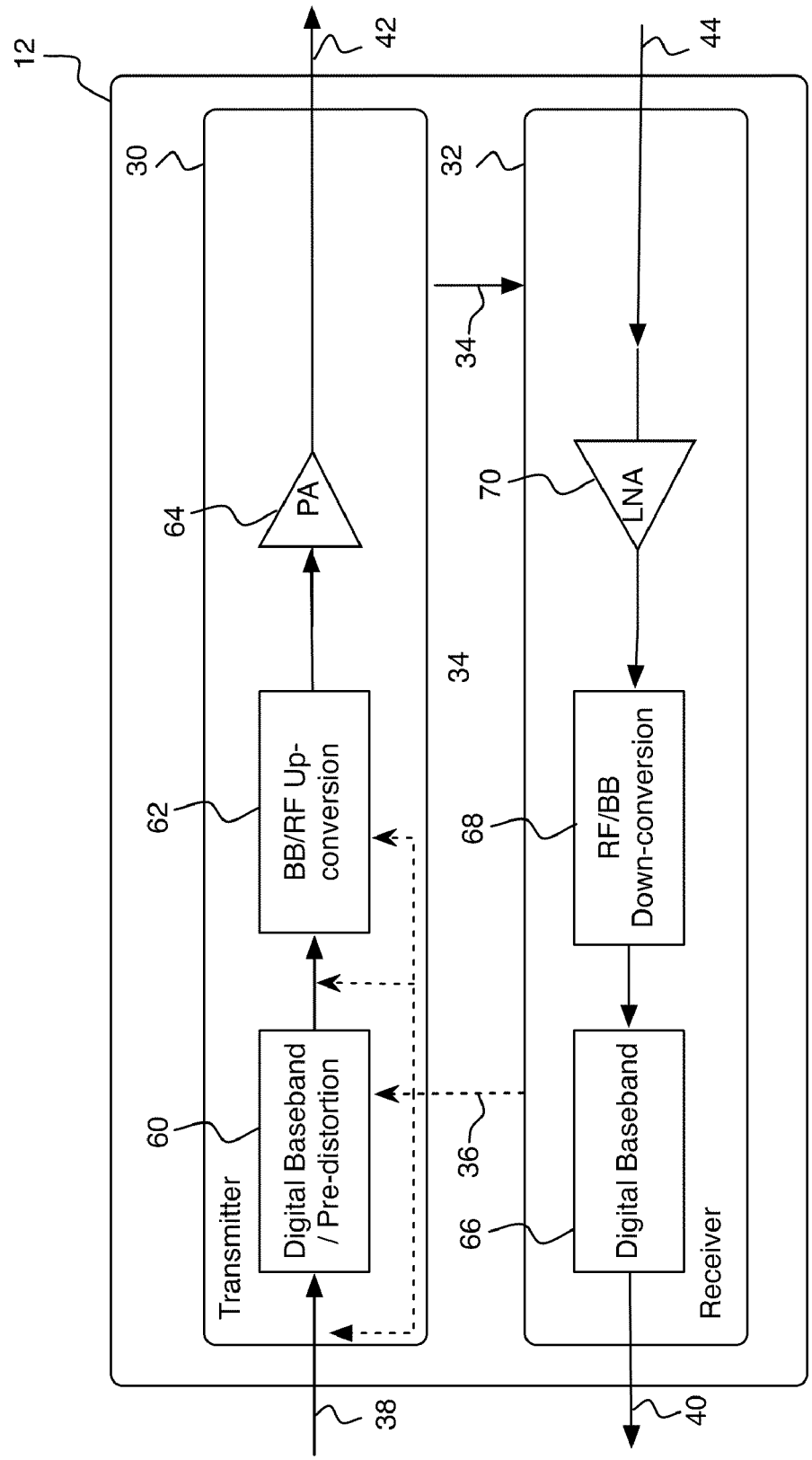
FIG. 7 is a block diagram of an enhanced wideband transceiver illustrating yet another embodiment of the connections between the transmitter and the receiver.

FIGS. 4, 5, 6, and 7 describe various elements of how a signal may be passed between operational transmitter 30 and operational receiver 32. FIG. 4 illustrates where a signal may be taken from operational transmitter 30. FIG. 5 illustrates where a signal may be injected into operational receiver 32. FIG. 6 illustrates where a signal may be taken from operational receiver 32. FIG. 7 illustrates where a signal may be injected into operational transmitter 30. In each one of these examples, various elements are illustrated as taking or receiving a signal. It is expressly understood that these examples may be combined in any way known by one skilled in the art, and in any order. For instance, in order to create a loop, a signal will be taken (as illustrated by FIG. 4) from operational transmitter 30, a signal will be injected into (as illustrated by FIG. 5) into operational receiver 32, a signal will be taken from operational receiver 32 (as illustrated by FIG. 6), and a signal will be injected back into operational transmitter 30 (as illustrated by FIG. 7). The points where a signal may be taken or injected may be selected from any one point or combination of points illustrated in any of the disclosed figures or known by one skilled in the art. It is expressly contemplated that a signal may also be drawn from elements not expressly shown (such as other amplifiers, filters, mixers) consistent with this disclosure.

As is disclosed by FIGS. 4-7, it is generally preferable in some embodiments to transmit an analog signal from operational transmitter 30 into operational receiver 32. It is also generally preferable in some embodiments to transmit a digital signal from operational receiver 32 into operational transmitter 30. Therefore, in these embodiments, at any point after a signal is transformed into an analog signal in operational transmitter 30, it can be sampled and transmitted to operational receiver 32. In addition, at any point that a signal is transformed into a digital signal in operational receiver 32 it can be sampled and transmitted into operational transmitter 30. It is expressly understood that while some preferred embodiments are disclosed, the addition of elements capable of using digital or analog signals may be added to operational receiver 32 and/or operational transmitter 30 removing the requirement to transform the digital and/or analog signal prior to transmitting the signal. It is therefore expressly understood that the signal which is found in operational transmitter 30 may be passed into operational receiver 32 at any point, and that the signal which is found in operational receiver 32 may be passed into operational transmitter 30 at any point.

In FIG. 4, first transmitter output 34 is disclosed as being taken from operational transmitter at locations which, in some embodiments, may include baseband to radio frequency up conversion device 62, a point in between baseband to radio frequency up conversion device 62 and power amplifier 64, power amplifier 64, or a point in between power amplifier 64 and antenna 16. It is expressly understood that first transmitter output 34 may be drawn from a single point or a combination of points. It is further expressly understood that first transmitter output 34 may be taken from other elements that may be added to operational transmitter 30, including, but not limited to other amplifiers, filters, mixers, or other elements. While it is expressly understood that it is preferable to draw an analog signal from operational transmitter 30 it is understood that a digital signal may also be drawn from operational transmitter 30.

In FIG. 5, first transmitter output 34 is disclosed as being injected into operational receiver 32 at locations which, in some embodiments, may include radio frequency to baseband down conversion device 68, a point in-between radio frequency to baseband down conversion device 68 and LNA 70, LNA 70, or a point in between LNA 70 and antenna 16. It is expressly understood that first transmitter output 34 may be injected into a single point or a combination of points. It is further expressly understood that first transmitter output 34 may be injected into other elements that may be added to operational receiver 32, including, but not limited to other amplifiers, filters, mixers, or other elements. While it is expressly understood that it is preferable to inject an analog signal into operational receiver 32 it is understood that a digital signal may also be injected into operational receiver 32.

In FIG. 6, first receiver output 36 is disclosed as being taken from operational receiver 32 at locations which, in some embodiments, may include a point in-between communication device 14 and digital baseband 66, digital baseband 66, a point in-between digital baseband 66 and radio frequency to baseband down conversion device 68, or radio frequency to baseband down conversion device 68. It is expressly understood that first receiver output 36 may be drawn from a single point or a combination of points. It is further expressly understood that first receiver output 36 may be taken from other elements that may be added to operational receiver 32, including, but not limited to other amplifiers, filters, mixers, or other elements. While it is expressly understood that it is preferable to draw a digital signal from operational receiver 32 it is understood that an analog signal may also be drawn from operational receiver 32.

In FIG. 7, first receiver output 36 is disclosed as being injected into operational transmitter 30 at locations which, in some embodiments, may include a point in-between digital baseband pre-distortion 60 and communication device 14, digital baseband pre-distortion 60, a point in-between digital baseband pre-distortion 60 and baseband to radio frequency up conversion device 62, or baseband to radio frequency up conversion device 62. It is expressly understood that first receiver output 36 may be injected into a single point or a combination of points. It is further expressly understood that first receiver output 36 may be injected into other elements that may be added to operational transmitter 30, including, but not limited to other amplifiers, filters, mixers, or other elements. While it is expressly understood that it is preferable to inject a digital signal into operational transmitter 30 it is understood that an analog signal may also be injected into operational transmitter 30.

While not explicitly shown, in each embodiment disclosed herein there may be a digital or analog signal converter or signal joiner at each junction where one or more signals are joined or split. This may be done for any purpose known to one skilled in the art, including, but not limited to, ensure that signals are properly joined or adjusting the strength of a signal prior to being joined or split. While these components are not explicitly shown, it is expressly understood that they may be present at any intersection of signals.

While in each example a single line is shown creating a signal connection between two or more components, it is expressly understood that any number of dissimilar connections may exist between any connected components. It is expressly understood therefore that each connection may contain a plurality of similar or dissimilar connections. These connections may be coupled through one or more physical connections.

FIGS. 3-7 are intended to be exemplary only. It is expressly understood that there are any number of different ways to connect operational transmitter 30 and operational receiver 32. The examples given are for exemplary purposes only.

FIG. 8 and FIG. 9 are examples of different embodiments of baseband to radio frequency up conversion device 62 which may be used in operational transmitter 30. It is expressly understood that any kind baseband to radio frequency up conversion device 62 may be used, and the embodiments illustrated by FIG. 8 and FIG. 9 are given for exemplary purposes only.

In the embodiment shown by FIG. 8, the system 90 of baseband to radio frequency up conversion device 62 and power amplifier 64 includes a transmit channelizer 92 receiving coded I and Q digital baseband signal inputs, wherein in this embodiment predistortion occurs after transmit channelizer 92. The I and Q digital inputs each typically comprise a stream of samples (or chips) representing a digital value, or word having n bits. The sample rate (or chip rate) of the I and Q inputs to the channelizer 92 is determined in accordance with the technology and/or standard utilized (e.g., CDMA (IS-95) is 1.2288 Mcps, UMTS is 3.84 Mcps, etc.). As will be appreciated, the processing, generation and functionality utilized to generate the I and Q digital signals that are input to the channelizer 92 are not shown or described. This is known to those of ordinary skill in the art. In general terms, the digital data is processed by encoding, interleaving, converting, and spreading (using any coding scheme including, but not limited to, orthogonal codes, psuedo-random (PN codes), and Orthogonal frequency-division multiplexing (OFDM)) to generate the I and Q digital baseband signals (often referred to as samples at a particular sampling rate).

It will be understood that the modulation and/or coding scheme utilized in the present invention is not limited to quadrature (I and Q) modulation or coding, and other modulation or coding techniques may be utilized with modifications to the present disclosure. In addition, the I and Q signals may relate to a single carrier or multiple (1 to N) carriers.

The transmit channelizer 92 receives baseband information in the form of I and Q digital samples (having n bits per sample) and tunes, combines, and up-converts the signals to a higher sampling frequency (or rate), usually thirty-two times the chip frequency (32Fc). The transmit channelizer 92 may also process the signals relative to pulse shaping, power control and peak power reduction, etc. The I and Q digital signals output from the transmit channelizer 92 are input to first digital-to-analog converter 94 and second digital-to-analog converter 96 to generate I and Q analog signals. The output, in some embodiments, from any point after first digital-to-analog converter 94 and second digital-to-analog converter 96 can be used as an input for operational receiver 32. Prior to input to an analog quadrature modulator 100, the I and Q analog signals are processed by an I/Q adjustment block 98 that performs filtering functions to remove any undesirable signal images and/or imperfections caused by the digital-to-analog conversion process.

The analog quadrature modulator 100 receives the I and Q analog signals and uses them to modulate an RF carrier signal (in-phase carrier and quadrature carrier (ninety degrees out of phase)) generated from a local oscillator (LO) 102 to output a combined and modulated RF carrier signal. The frequency of the RF carrier is determined in accordance with the desired carrier frequency designated by the technology, standard and/or allocated frequency spectrum (e.g., ranges around 850 MHz (IS-95), 1.9 GHz (PCS), 2.1 GHz (UMTS), etc.).

The modulated RF carrier output from the analog quadrature modulator 100 is further processed with analog amplifier 106, attenuation 108, and amplifier 110, which may include amplification, attenuation, and filtering functionality as desired (not shown in detail). The output from amplifier 110 is input to a bandpass filter 112 that eliminates any spurious signals outside the RF band of interest (RF carrier bandwidth or allocation bandwidth for a multi-carrier transmitter). A pre-amplifier 114 amplifies the bandpass-filtered modulated RF carrier signal for input to the power amplifier 64 and eventual output to antenna 16.

FIG. 9 is another embodiment of a transmission system 130 including the baseband to radio frequency up conversion device 62 and the power amplifier 64. The transmission system 130 includes a transmit channelizer 132, that is the same or similar to the transmit channelizer 92 shown in FIG. 8. The I and Q digital signals may be those associated with a single communications channel (or single user, e.g., communications signal transmitted from a wireless subscriber handset), a group of communications channels (or multiple users, e.g., communications signals transmitted from a base station, or multiple subscriber or data channels). In addition, the transmission system 130 may support single or multiple carriers and multiple standards. As will be appreciated, the term digital baseband signals may refer to the inputs to the channelizer 132 and/or the outputs of the channelizer 132 (and any intermediate digital signals in the upconversion and modulation process prior to achieving the modulated intermediate frequency (IF) signals). Accordingly, it will be understood that the digital up-converter (described below) may also include the channelizer 132.

The I and Q digital outputs of the transmit channelizer 132 are input to a digital up-converter 136 having its output (modulated digital IF signals) thereof input to a digital (digital-to-digital) sigma-delta modulator 138. The outputs of the digital sigma-delta modulator 138 are input to a high speed digital multiplexer 142. A local oscillator (LO) 140 generates a local oscillator or clocking signal at a desired frequency (usually a multiple of the carrier frequency, including non-integer multiples of the carrier frequency) to multiplex the signals input to the multiplexer 142. The output, in some embodiments, from any point after multiplexer 142 can be used as an input for operational receiver 32. The output of the multiplexer 142 is a single bit stream output that is filtered by a bandpass filter 144 that converts the bit stream to analog format and further processes the signal. A more detailed discussion of the transformation of the digital to analog transformation may be found in U.S. Pat. No. 6,987,953 which is hereby incorporated by reference.

As illustrated by FIG. 8 and FIG. 9, the baseband to radio frequency up conversion device 62 may be implemented in any way known to one skilled in the art. In these cases, a conventional digital analog conversion module may not be required, as disclosed by various methods. It is expressly understood that the signal which is found in operational transmitter 30 may be passed into operational receiver 32 at any point. It is further expressly understood that the output may be taken from PA 64, however it is understood that the signal may be taken at a point within baseband to radio frequency up conversion device 62 after the signal had been converted into an analog signal.

FIG. 10 and FIG. 11 are examples of different embodiments of the radio frequency to baseband down conversion device 68 of operational receiver 32. It is expressly understood that any kind of receiver may be used, and the embodiments illustrated by FIG. 10 and FIG. 11 are shown to illustrate that a signal may be drawn or inserted at various places throughout the radio frequency to baseband down conversion device 68.

FIG. 10 is a receiver system 150 comprising LNA 70 and one embodiment of the radio frequency to baseband down conversion device 68 of operational receiver 32. The receiver system 150 receives an RF signal on a receiver antenna (e.g., antenna 16) for input to a LNA 70. The amplified RF signal is filtered, attenuated and amplified again by the components identified by reference numerals 152 and 154. The frequency of the RF signal is determined in accordance with the desired carrier frequency designated by the technology, standard, and/or allocated frequency spectrum (e.g., ranges around 850 MHz (IS-95), 1.9 GHz (PCS), 2.1 GHz (UMTS), etc.).

An analog quadrature demodulator 158 receives the RF signal and demodulates the signal using in-phase and quadrature carrier signals generated from a local oscillator (LO) 156. It will be understood that the demodulation and/or decoding scheme utilized in the present invention is not limited to quadrature (I and Q) demodulation or decoding, and other demodulation or decoding techniques may be utilized with modifications to the present invention. In addition, the I and Q signals may relate to a single carrier or multiple (1 to N) carriers.

The demodulated I and Q analog signals are subsequently processed by low pass filters 160, 162, amplifiers 164, 166, tunable low pass filters 168, 170 (functioning to select one or more carriers), and/or low pass filters 172, 174. The demodulated I and Q analog signals are input to analog-to-digital converters 176, 178 to generate I and Q digital signals. The output from analog-to-digital converters 176, 178 may be used as the output for operational receiver 32 that can be input into the operational transmitter 30. The I and Q digital output signals each typically comprise a stream of samples representing a digital value, or word having n bits. At this point, the I and Q digital signals are typically operating at a sampling frequency (or rate) that is some multiple (integer or non integer) of the symbol rate, which may be thirty-two times the chip frequency (32Fc). A different frequency or rate for the I and Q signals output from the A/D converters 176, 178 may be desired and/or utilized.

The demodulated I and Q digital signals (at a rate higher than the chip rate or frequency) are input to a receive channelizer 180. The receive channelizer 180 further downconverts and filters/selects the I and Q signals to generate individual channels (or carriers) of I and Q digital baseband signals. The sample rate (or chip rate or frequency) of the I and Q outputs from the receive channelizer 180 is generally determined in accordance with the technology and/or standard utilized (e.g., CDMA(IS-95) is 1.2288 Mcps, UMTS is 3.84 Mcps, or a multiple thereof, etc.). In general terms, the receive channelizer 180 receives I and Q digital samples (having n bits per sample) and tunes, downconverts, and separates the signals to a lower sampling frequency (or rate), usually equal to a multiple of the chip rate or chip frequency (Fc). The receive channelizer 180 may also process the signals to measure power or inject noise.

As will be appreciated, the processing, generation and functionality utilized to further process and recover the received data from the I and Q digital signals that are output from the receive channelizer 180 are not shown or described. This is known to those of ordinary skill in the art. In general terms, the digital data is further processed by de-spreading (using any coding scheme including, but not limited to, orthogonal codes, psuedo-random (PN codes), and Orthogonal frequency-division multiplexing (OFDM)) de-interleaving, and decoding to generate the received data.

With reference to FIG. 11, there is shown a block diagram of an exemplary digital receiver system 190 comprising LNA 70 and radio frequency to baseband down conversion device 68. As with the previous example, the I and Q digital signals (or other types of signals, depending on the modulation scheme utilized) may be those associated with a single communications channel (or single user, e.g., communications signal transmitted from a wireless subscriber handset), a group of communications channels (or multiple users, e.g., communications signals transmitted from a base station, or multiple subscriber or data channels). In addition, the digital receiver system 190 of the present invention may support single or multiple carriers and multiple standards. As will be appreciated, the term digital baseband signals may refer to the outputs from a channelizer 204 and/or the inputs to the channelizer 204 (and any intermediate digital signals in the down conversion process after demodulation of the intermediate frequency (IF) signals). Accordingly, it will be understood that the digital down-converter (described below) may also include the channelizer 204.

The description of the elements in FIG. 11 illustrates a signal being passed from LNA 70 into bandpass filter 192. Bandpass filter 192 passes a single amplified RF signal into the phased sample and hold circuit 198. A local oscillator (LO) 194 generates a local clocking signal operating at a desired frequency (usually a multiple of the desired carrier frequency) to provide control and timing of the phased sample and hold circuit 198 which processes the single RF signal as known to one skilled in the art and outputs the RF signal into the A/D sigma-delta converter 200. Analog-to-digital sigma-delta converter 200 converts the RF signal and transmits the converted RF signal into digital down-converter 202. Digital down converter 202 creates I and Q digital signals which are used as inputs for channelizer 204. In some embodiments, the output from analog-to-digital (A/D) sigma-delta converter 200, digital down-converter 202, or channelizer 204 may be used as the first receiver output 36 for operational transmitter 30.

As illustrated by FIG. 10 and FIG. 11, the radio frequency to baseband down conversion device 68 may be implemented in any way known to one skilled in the art. In these cases, a conventional analog digital conversion module may not be required, as disclosed by various methods. It is expressly understood that the signal which is found in operational receiver 32 may be passed into operational transmitter 30 at any point after appropriate preparation. It is expressly understood that, in some embodiments, it is preferable that the signal from be taken at a point within radio frequency to baseband down conversion device 68 after the signal had been converted into a digital signal.

Figure 12:
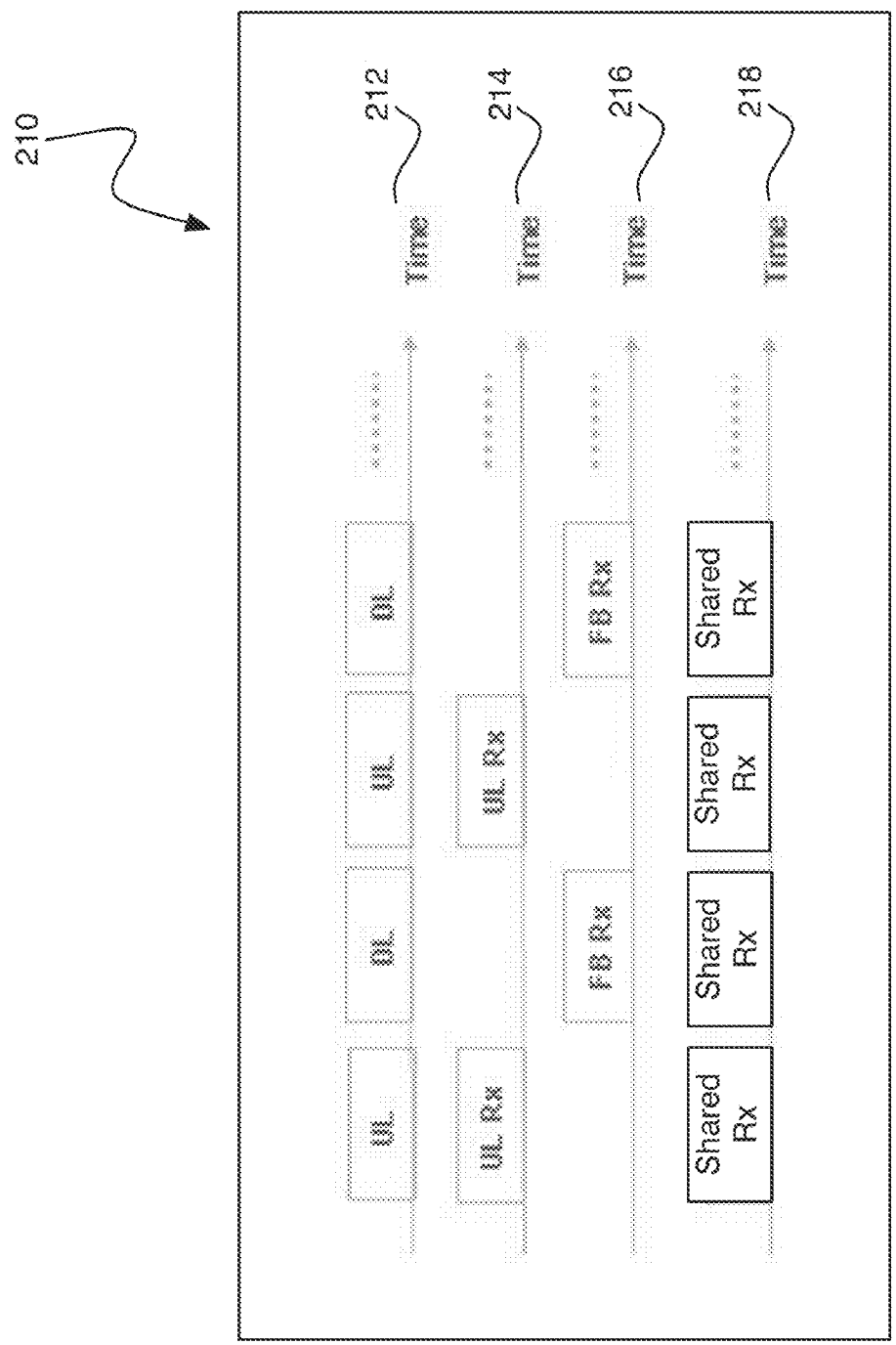
FIG. 12 is a block diagram of one implementation of the enhanced wideband receiver using a time division duplex radio operation.
Figure 13:
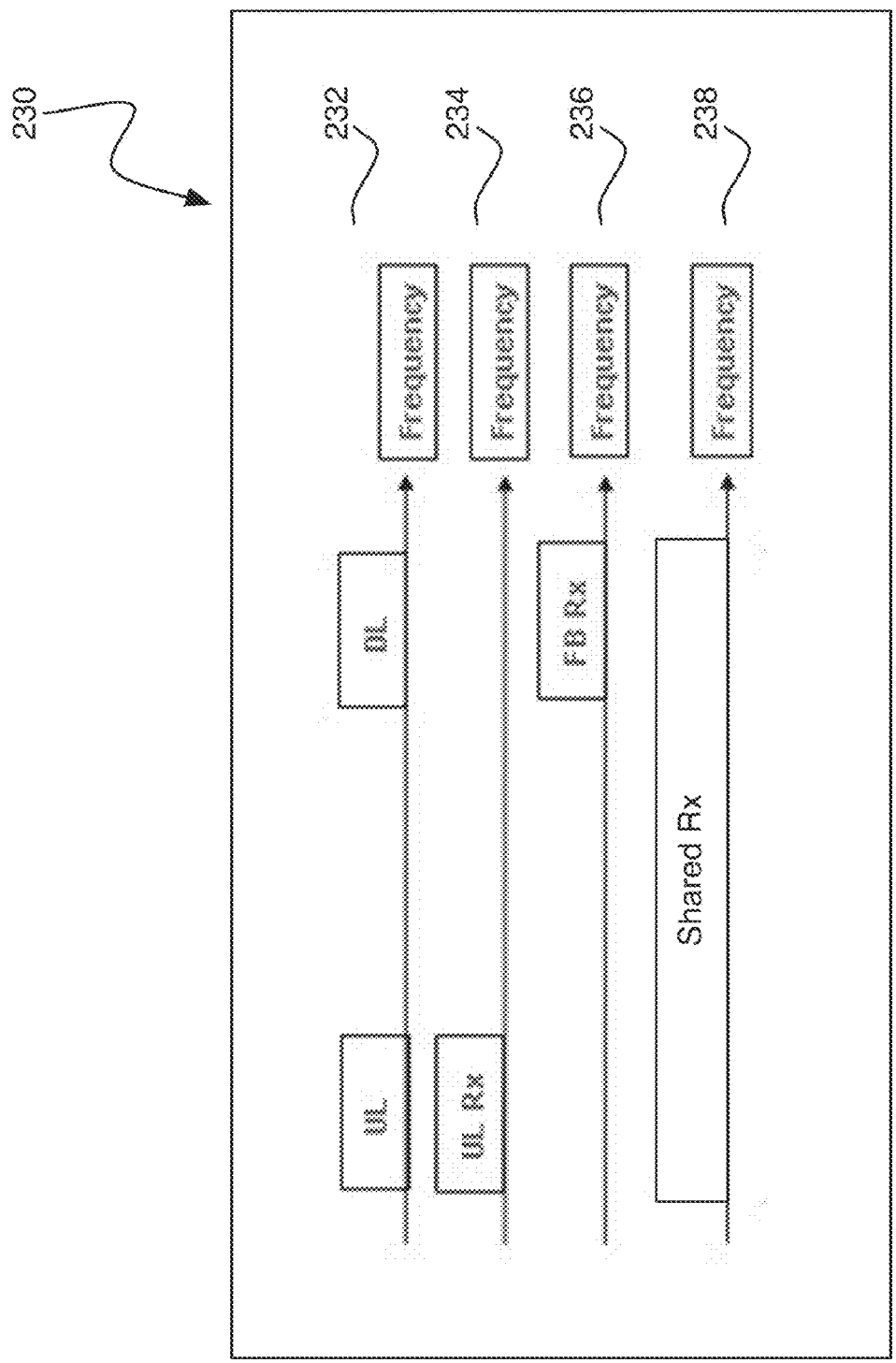
FIG. 13 is a block diagram of one implementation of the enhanced wideband receiver using frequency division duplex radio operation.
Figure 14:
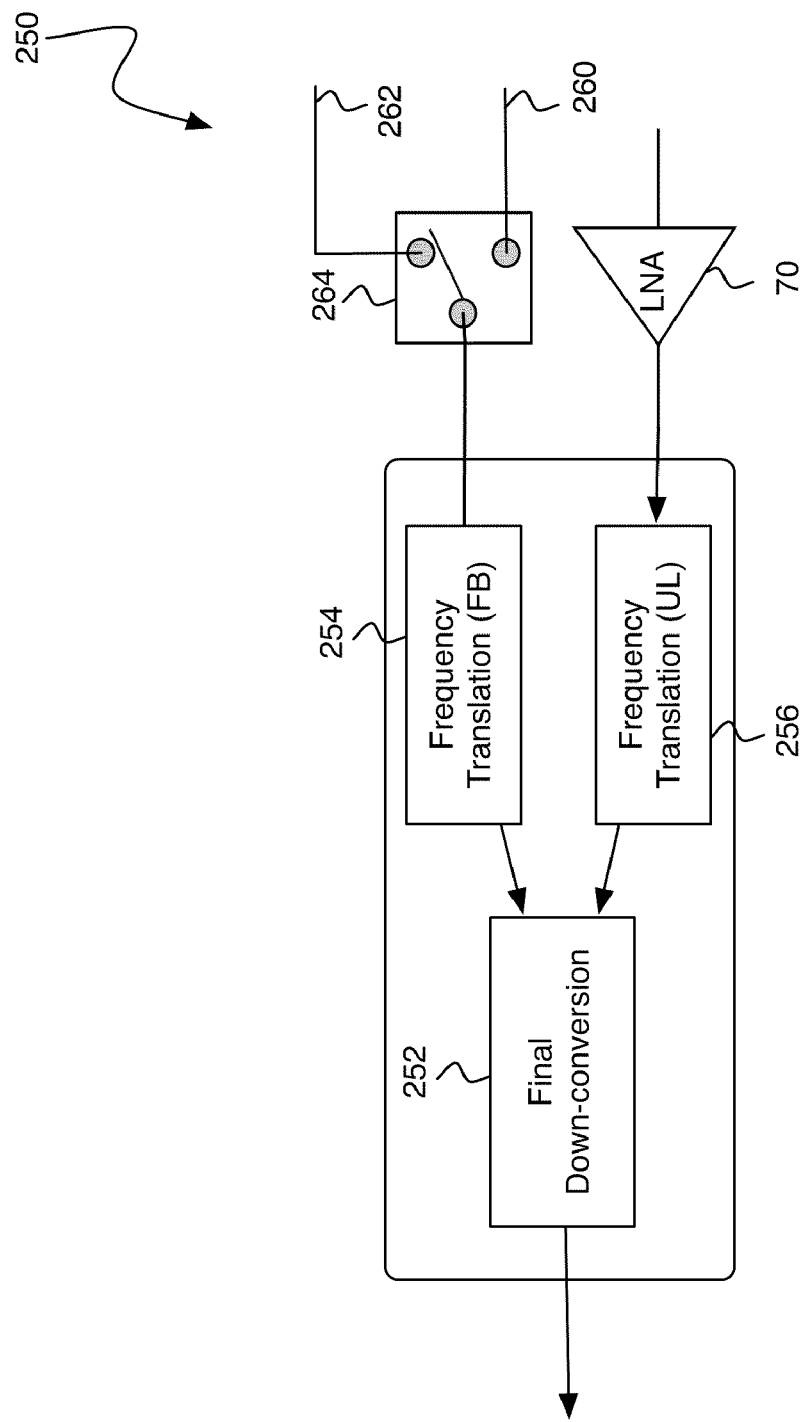
FIG. 14 is a block diagram of another implementation of the enhanced wideband receiver using frequency division duplex radio operation.

FIGS. 1-11 illustrate some embodiments of implementing the structural relationship of elements within integrated wideband transceiver 12, while FIGS. 12, 13, and 14 illustrate some of the ways of operating integrated wideband transceiver 12. As will be appreciated by one skilled in the art, when multiple signals are transmitted either concurrently or consecutively, an operation scheme may be used to prevent signals from suffering from interference created by other signals, thereby permitting signals to be sent and received accurately and reliably. Types of operation schemes include, but are not limited to, time division duplex and frequency division duplex operation schemes. In time division duplex, signals are sent and received at different times to avoid two signals interfering with each other. In frequency division duplex, signals are sent and received at different frequencies to avoid two signals from interfering with each other. While frequency division duplex and time division duplex operations are discussed in detail in this disclosure, it is expressly understood that any operation scheme could be used consistent with the present disclosure, including, but not limited to combinations of frequency division duplex and time division duplex.

FIG. 12 is a block diagram 210 of one implementation of the integrated wideband transceiver 12 using a time division duplex radio operation. In this embodiment the uplink and downlink are time duplexed (the downlink and uplink functions are used at different times). For the purpose of clarity, when the terms "uplink" and "downlink" are used in reference to the element integrated wideband transceiver 12 found in FIG. 1, throughout FIGS. 12, 13, and 14, downlink is intended to refer to a signal which is transmitted from integrated wideband transceiver 12, and uplink is intended to refer to a signal which is received by integrated wideband transceiver 12.

In the embodiment illustrated by FIG. 12, The X-axis of this diagram represents time, while the Y axis represents the signal. Four signals are plotted on this diagram, and where a signal is active, a box appears to correspond with the signal to illustrate that both the signal is active and what kind of signal is active. Signal 212 illustrates whether the uplink (UL) or downlink (DL) signal is currently active, and is used to display the status of all send and receive signals being received or sent by integrated wideband transceiver 12. Signal 214 is the UL receiver (Rx) signal. Signal 214 is active when signal 212 is in the UL mode. Signal 216 is the Feedback (FB) receiver (Rx) signal. Signal 216 is active when signal 212 is in the DL mode.

The present disclosure teaches systems and methods that permit a common receiver to perform both the FB Rx and UL Rx operations. Signal 218, which is the Shared Rx signal, is an example of using a common receiver, such as operational receiver 32, for both the FB Rx and UL Rx signals. Since operational receiver 32 is active when the operational transmitter 30 is inactive, when signal 212 is active with a DL signal, operational receiver 32 is active and capable of acting as the feedback receiver. When signal 212 is active with a UL signal, operational receiver 32 is active and capable of acting as the UL receiver.

In embodiments using time division duplex radio operations, the point of injection of the feedback signal in to the uplink receiver would be chosen to minimize the impact of the large Tx signal on the receiver sensitivity. Nominally this would be after the LNA but this is not a requirement. A single uplink receiver could be shared across multiple transmitters in cases where the number of downlink chains is higher than the number of uplink chains.

FIG. 13 is a block diagram 230 of one implementation of the enhanced wideband receiver using frequency division duplex radio operation. Unlike time division duplex radio operation, in frequency division duplex radio operation where the uplink and downlink operate continuously but in different frequency spectrum. In this radio operation, an uplink receiver of sufficient bandwidth replaces both the 'feedback receiver' and the uplink receiver so that it can simultaneously observe both frequency spectrum (downlink and uplink). FIG. 13 is similar to FIG. 12, except that the X-axis of FIG. 13 represents frequency.

In the example shown in FIG. 13, four signals are plotted on this diagram. Unlike FIG. 12, the signals shown in FIG. 13 may be simultaneous, (e.g. the DL and UL signal may operate concurrently). Signal 232 is illustrates that a UL signal and DL are operating at different frequencies. Signal 234 shows that the UL Rx signal is operating at the same frequency as the UL signal. Signal 236 shows that the FB Rx signal is operating at the same frequency as the DL signal. Signal 238 shows the Shared Rx signal of the operational receiver 32 which is operable at both the frequency of the UL and the frequency of the DL signal.

As shown, in FIG. 13, frequency division duplex operation means that a feedback signal is always available to operational transmitter 30. This is in contrast to the previously discussed time division duplex operation where a signal is only available with the DL signal is active. The draw back of this approach is that the UL Rx hardware in the frequency division duplex operation must be capable of a much larger frequency range to allow the frequency division duplex receiver to constantly monitor both the send domain and the receive domain. It is understood that in this case since the UL Rx hardware needs to span a larger duplex frequency to observe both the uplink and the downlink signals there will be a cost/power/area increase. However, this may be offset by the benefits accrued by eliminating the feedback receiver. Alternatively, the two signals (UL Rx and FB Rx) could be moved closer together by any way known to one skilled in the art, including, but not limited to techniques including aliasing or mixing or folding so that the receiver need only be as wide as the combined signals. This would mean that there would be no need to span the entire duplex frequency.

FIG. 14 is a block diagram of a shared switching mechanism 250 used by another implementation of the enhanced wideband receiver using frequency division duplex radio operation illustrating one technique of mixing the signal into the receiver. In this instance it may be possible to time share the FB portion of the receiver if an additional circuit is used to alias or mix or fold the feedback signal e.g. that input branch of the receiver can be switched to multiple locations while uplink receive function remains operational. This approach combines the advantages of frequency division duplex operation with the advantages of time division duplex operation, as the receiver only has to monitor a limited duplex frequency range while still being able to access the feedback signal at any time.

In this embodiment, a shared switching mechanism 250 comprises switch 264 with a first position 262 and second position 260, a Frequency Translation (FB) 254, a Frequency Translation (UL) 256, and a final down-conversion 252. The shared switching mechanism 250 is connected within integrated wideband transceiver 12 so that the output from final-down conversion 252 is transmitted into radio frequency to baseband down conversion device 68, and the input from switch 264 may, in some embodiments, be from operational transmitter 30. First position 262 may accept input from source including, but not limited to, first transmitter output 34, or another operational transmitter. Second position 260 may accept input from antenna 16, be connected to a ground, first transmitter output 34, or another operational transmitter. It is expressly understood that the point where a signal is drawn from first position 262 and second position 260 when both first position 262 and second position 260 are connected to operational transmitter 30 may not be the same.

In the example shown in FIG. 14, LNA 70 feeds a signal from antenna 16 into Frequency Translation (UL) 256. Switch 264 feeds a signal into Frequency Translation (FB) 254. The signal from switch 264 may come from operational transmitter 30, ground, antenna 16, or another operational transmitter. Frequency Translation (UL) 256 and Frequency Translation (FB) 254 feed a signal into final down-conversion 252. This signal then may be passed to radio frequency to baseband down conversion device 68 or other element known to one skilled in the art. The purpose of shared switching mechanism 250 is to time share the FB receiver among multiple transmitters and LNA 70. This process permits the radio frequency to baseband down conversion device 68 to receive alternative inputs based upon whether the operational receiver is generating a signal for communication device 14 or for operational transmitter 30, as known to one skilled in the art.

It is contemplated that integrated wideband transceiver 12 may be any kind of digital signal, including, but not limited to, signals compatible with any one or more of the following communications standards: global system for mobile communications (GSM), enhanced data rates for GSM evolution (EDGE), universal mobile telecommunications System (UMTS), code division multiple access (CDMA), WiMAX (IEEE §802.16d and §802.16e), IEEE §802.20, 3GPP, 3GPP2, LTE, or any other type of digital signal. It is further expressly contemplated that a plurality of dissimilar signal types may be transmitted into integrated wideband transceiver 12. This combination may be done in any way known in the art, including, but not limited to, time domain combining and frequency domain combining.

Figure 15:
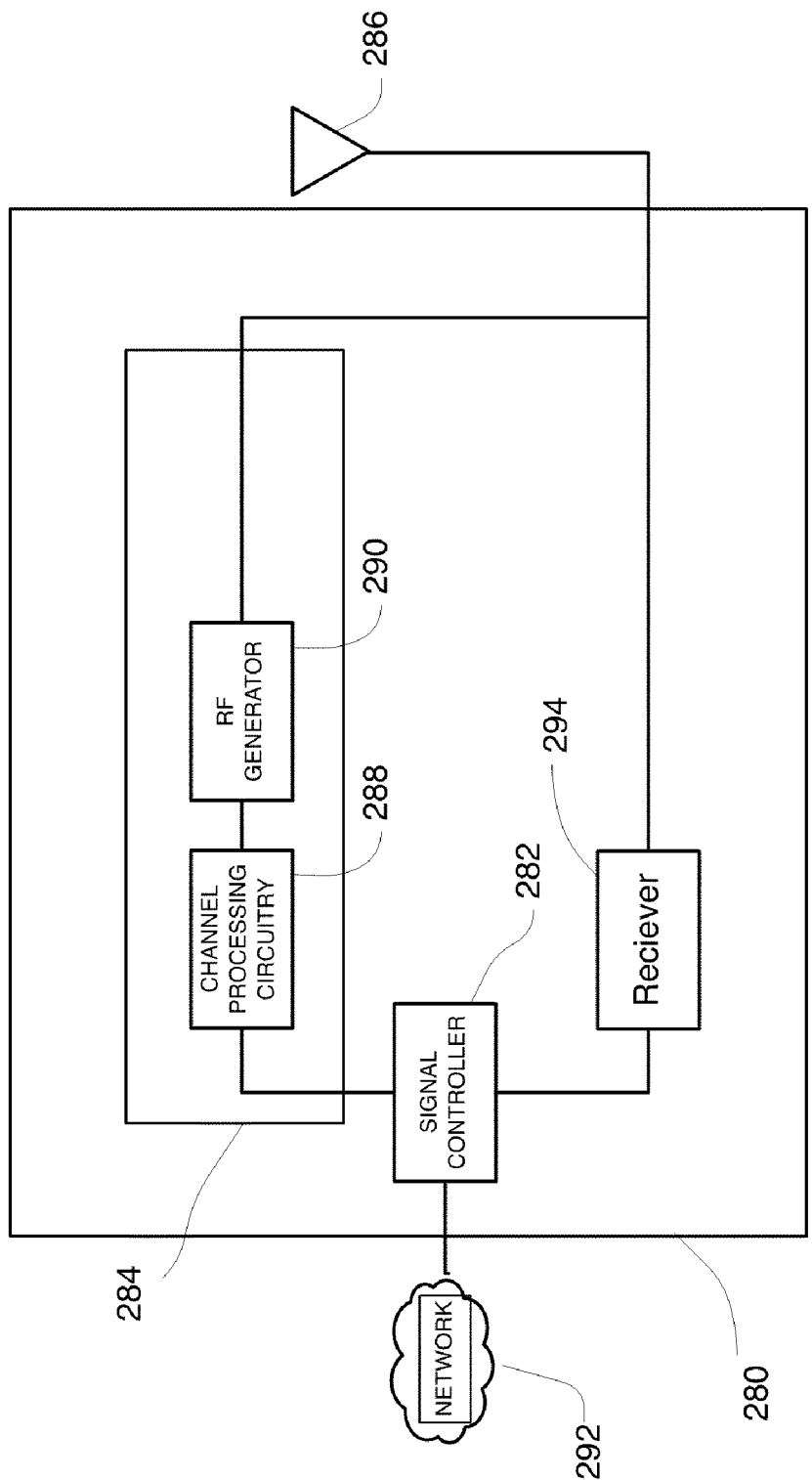
FIG. 15 is a block diagram of a base station unit.

As shown in FIG. 15, disclosed integrated wideband transceiver system 10 design may be incorporated into a base station controller removing the requirement for a separate a transmitter 284 and a receiver 294. Exemplary base station 280 is a medium to high-power multi-channel, two-way radio in a fixed location. Typically it may be used by low-power, single-channel, two-way radios or wireless devices such as mobile phones, portable phones and wireless routers. Base station 280 may comprise a signal controller 282 that is coupled to a transmitter 284 and a receiver 294. Transmitter 284 and receiver 294 (or combined transceiver) is further coupled to an antenna 286. In base station 280, digital signals are processed in signal controller 282. The digital signals may be signals for a wireless communication system, such as signals that convey voice or data intended for a mobile terminal (not shown). Base station 280 may employ any suitable wireless technologies or standards such as 2G, 2.5G, 3G, GSM, IMT-2000, UMTS, iDEN, GPRS, 1xEV-DO, EDGE, DECT, PDC, TDMA, FDMA, CDMA, W-CDMA, LTE, TD-CDMA, TD-SCDMA, GMSK, OFDM, WiMAX, the family of IEEE §802.11 standards, the family of IEEE §802.16 standards, IEEE §802.20, etc. Signal controller 282 then transmits the digital signals to transmitter 284, which includes a channel processing circuitry 288. Channel processing circuitry 288 encodes each digital signal, and a radio frequency (RF) generator 290 modulates the encoded signals onto an RF signal. The resulting output signal is transmitted over antenna 286 to the mobile terminal. Antenna 286 also receives signals sent to base station 280 from the mobile terminal. Antenna 286 couples the signal to receiver 294 that demodulates them into digital signals and transmits them to signal controller 282 where they may be relayed to an external network 292. Base station 280 may also comprise auxiliary equipment such as cooling fans or air exchangers for the removal of heat from base station 280.

In an embodiment, one or more embodiments of integrated wideband transceiver system 10 may be incorporated into base station 280 in lieu of parts, if not all, of generator 290, which may decrease the capital costs and power usage of base station 280. The power amplifier efficiency measures the usable output signal power relative to the total power input. The power not used to create an output signal is typically dissipated as heat. In large systems such as base station 280, the heat generated in may require cooling fans and other associated cooling equipment that may increase the cost of base station 280, require additional power, increase the overall size of the base station housing, and require frequent maintenance. Increasing the efficiency of base station 280 may eliminate the need for some or all of the cooling equipment. Further, the supply power to integrated wideband transceiver system 10 may be reduced since it may more efficiently be converted to a usable signal. The physical size of base station 280 and the maintenance requirements may also be reduced due to the reduction of cooling equipment. This may enable base station 280 equipment to be moved to the top of a base station tower, allowing for shorter transmitter cable runs and reduced costs. In an embodiment, base station 280 has an operating frequency ranging from about 450 MHz to about 3.5 GHz.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of broader terms such as "comprises", "includes", "having", etc. should be understood to provide support for narrower terms such as "consisting of", "consisting essentially", of "comprised substantially of", etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A transceiver, comprising:
    a transmitter operable to convert baseband communication signals into corresponding RF communication signals;
    a receiver operable:
        to convert received RF communication signals into corresponding baseband communication signals; and
        to convert RF feedback signals into corresponding baseband feedback signals; and
    signal coupling elements operable to couple at least a portion of the RF communication signals of the transmitter as RF feedback signals to the receiver for conversion into corresponding baseband feedback signals and to couple at least a portion of the baseband feedback signals to the transmitter, wherein the signal coupling elements are operable to switch between a transmission configuration in which the signal coupling elements couple at least a portion of the RF communication signals of the transmitter as RF feedback signals to the receiver for conversion into corresponding baseband feedback signals and couple at least a portion of the baseband feedback signals to the transmitter and a reception configuration in which the signal coupling elements do not couple the RF communication signals of the transmitter to the receiver.

2. The transceiver as defined in claim 1, wherein the RF communication signals of the transmitter and the RF feedback signals are in a transmit frequency band and the RF communication signals of the receiver are in a receive frequency band different from the transmit frequency band.

3. The transceiver as defined in claim 1, comprising multiple transmitters and multiple sets of signal coupling elements, each set of signal coupling elements being operable to couple its respective transmitter to the receiver to couple at least a portion of the RF communication signals of its respective transmitter as RF feedback signals to the receiver and at least a portion of respective baseband feedback signals to its transmitter, wherein each set of signal coupling elements is operable to switch between a transmission configuration in which the subject set of signal coupling elements couple at least a portion of the RF communication signals of its respective transmitter as RF feedback signals to the receiver for conversion into corresponding baseband feedback signals and couple at least a portion of the baseband feedback signals to the respective transmitter and a reception configuration in which the subject set of signal coupling elements do not couple the RF communication signals of the respective transmitter to the receiver.

4. The transceiver as defined in claim 1, wherein the transmitter comprises a control element responsive to the baseband feedback signals to perform a control action selected from a group consisting of:
    training operation of the transmitter;
    adaptively training operation of the transmitter;
    linearizing operation of the transmitter; and
    adjusting predistortion of the transmitter.

5. The transceiver as defined in claim 1, wherein the baseband signals are digital signals and the RF signals are analog signals.

6. The transceiver as defined in claim 5, wherein the baseband feedback signals are sampled signals.

7. The transceiver as defined in claim 1, wherein the transmitter comprises a power amplifier and a baseband to RF up-converter feeding the power amplifier, and the portions of the RF communication signals are tapped from a location selected from a group consisting of:
    the baseband to RF up-converter;
    the power amplifier;
    an output of the baseband to RF up-converter;
    an input of the power amplifier; and
    the output of the power amplifier.

8. The transceiver as defined in claim 1, wherein the receiver comprises an RF to baseband down-converter and a low noise amplifier feeding the down-converter, and the portions of the RF communication signals of the transmitter are coupled as RF feedback signals to a location selected from a group consisting of:
- an input of the low noise amplifier;
- the low noise amplifier;
- an output of the low noise amplifier;
- an input of the down-converter; and
- the down-converter.

9. The transceiver as defined in claim 1, wherein the receiver comprises an RF to baseband down-converter and a low noise amplifier feeding the down-converter, and the portions of the baseband feedback signals of the transmitter are coupled to a location selected from a group consisting of:
- the down-converter;
- an output of the down-converter; and
- a location downstream of the down-converter.

10. A method of operating a transceiver, comprising:
- operating a transmitter of the transceiver to convert baseband communication signals into corresponding RF communication signals;
- operating a receiver of the transceiver to convert RF communication signals into corresponding baseband communication signals;
- coupling at least a portion of the RF communication signals of the transmitter as RF feedback signals to the receiver;
- operating the receiver to convert the RF feedback signals into corresponding baseband feedback signals; and
- coupling at least a portion of the baseband feedback signals to the transmitter, wherein coupling at least a portion of the RF communication signals and coupling at least a portion of the baseband feedback signals comprises switching cowling between a transmission configuration in which the signal coupling elements couple at least a portion of the RF communication signals of the transmitter as RF feedback signals to the receiver for conversion into corresponding baseband feedback signals and couple at least a portion of the baseband feedback signals to the transmitter and a reception configuration in which the signal coupling elements do not couple the RF communication signals of the transmitter to the receiver.

11. The method as defined in claim 10, wherein the RF communication signals of the transmitter are in a transmit frequency band and the RF communication signals of the receiver are in a receive frequency band different from the transmit frequency band.

12. The method as defined in claim 10, wherein the transceiver comprises multiple transmitters and multiple sets of signal coupling elements, the method comprising operating each set of signal coupling elements to couple its respective transmitter to the receiver to couple at least a portion of the RF communication signals of its respective transmitter as respective RF feedback signals to the receiver and at least a portion of respective baseband feedback signals to its transmitter, wherein operating each set of signal coupling elements comprises switching the set of signal coupling elements between a transmission configuration in which the signal coupling elements couple at least a portion of the RF communication signals of the transmitter as RF feedback signals to the receiver for conversion into corresponding baseband feedback signals and couple at least a portion of the baseband feedback signals to the transmitter and a reception configuration in which the signal coupling elements do not couple the RF communication signals of the transmitter to the receiver.

13. The method as defined in claim 10, comprising controlling the transmitter responsive to the baseband feedback signal to perform a control action selected from a group consisting of:
- training operation of the transmitter;
- adaptively training operation of the transmitter;
- linearizing operation of the transmitter; and
- adjusting predistortion of the transmitter.

14. The method as defined in claim 10, wherein the baseband signals are digital signals and the RF signals are analog signals.

15. The method as defined in claim 14, wherein the baseband feedback signals are sampled signals.

16. The method as defined in claim 10, wherein the transmitter comprises a power amplifier and a baseband to RF up-converter feeding the power amplifier, comprising tapping the portions of the RF communication signals from a location selected from a group consisting of:
- the baseband to RF up-converter;
- the power amplifier;
- an output of the baseband to RF up-converter;
- an input of the power amplifier; and
- the output of the power amplifier.

17. The method as defined in claim 10, wherein the receiver comprises an RF to baseband down-converter and a low noise amplifier feeding the down-converter, comprising coupling the portions of the RF communication signals of the transmitter as RF feedback signals to a location selected from a group consisting of:
- an input of the low noise amplifier;
- the low noise amplifier;
- an output of the low noise amplifier;
- an input of the down-converter; and
- the down-converter.

18. The method as defined in claim 10, wherein the receiver comprises an RF to baseband down-converter and a low noise amplifier feeding the down-converter, comprising coupling portions of the baseband feedback signals of the transmitter to a location selected from a group consisting of:
- the down-converter;
- an output of the down-converter; and
- a location downstream of the down-converter.

* * * * *